Nov. 4, 1952     F. D. McBRIDE     2,616,384

FLUXING STICK

Filed March 11, 1948

INVENTOR.
FRANK D. McBRIDE,
BY

ATTORNEYS

UNITED STATES PATENT OFFICE 2,616,384

FLUXING STICK

Frank D. McBride, Philadelphia, Pa.

Application March 11, 1948, Serial No. 14,303

2 Claims. (Cl. 113—110)

This invention relates to a fluxing stick adapted for use in soldering, tinning and similar operations, and more particularly to a fluxing stick which in solid form comprises flux only. Still more particularly the fluxing stick according to this invention may include solder in addition to flux adapting it to be used directly for tinning as well as for fluxing; and method for its production.

The fluxing stick according to this invention is distinguished from fluxes heretofore known in that, composed of flux only without any binding or filling agent or compression, it is in homogeneous, stone-like, solid form, is rigid and self-sustaining, unaffected by atmospheric temperature, and in one form protected against absorption of moisture. The stick is adapted for direct application to the work and where, as it may, it contains solder in addition to flux, is adapted for use to effect tinning by direct application to the work.

Heretofore fluxes have been provided in granular and paste forms and variously in stick form. However, fluxes in stick form as heretofore known have included a binding agent, such as a wax, as beeswax, or grease, as petroleum, or both in very large proportion relative to the flux content and as a consequence were of little practical value because of their low flux content and their tendency to deform and to become messy under temperature and humidity conditions such as exist in summer. In distinction, the fluxing stick according to this invention comprises 100% flux uncompressed and free from any other ingredient, except as it may contain solder, yet it is solid, self-sustaining and will not deform under atmospheric temperatures.

From the broad standpoint the fluxing stick according to this invention comprises ammonium chloride, zinc chloride and zinc oxide, or equivalently zinc carbonate or zinc hydroxide, produced by fusing the three together into a homogeneous mass or solution and cooling in a mold of desired size and shape.

In forming the stick the ammonium chloride and zinc chloride may be used in widely varying proportion, as, for example, zinc chloride 10%–90% to ammonium chloride 90%–10%. As an example of preference the double salt zinc ammonium chloride, comprising zinc chloride 56% and ammonium chloride 44% will be used. The zinc oxide will be in about molar proportion with the ammonium chloride, i. e., in amount of about 75% by weight of the amount of ammonium chloride, or where the double salt is used in amount of about 33% by weight of the double salt.

In proceeding for the formation of the fluxing stick by the method according to this invention, the zinc chloride, ammonium chloride (or the double salt) and zinc oxide will be melted together at a temperature at which they will form a clear homogeneous mixture or solution. The formation of a clear homogeneous mixture or solution will be accompanied by the evolution of some water vapor and a very slight amount of ammonia indicating a partial reaction between the ammonium chloride and the zinc oxide. The use of temperature substantially beyond that necessary to effect the formation of a homogeneous mixture or solution is to be avoided in order to avoid carrying the reaction between the ammonium chloride and zinc oxide beyond that occurring at the temperature at which a homogeneous mixture or solution will be formed. Generally speaking, depending upon the particular proportions of the ingredients, a homogeneous mixture or solution will be formed at a temperature within about the range 250° F.–300° F., well below the temperature necessary to complete reaction between the ammonium chloride and the zinc oxide.

When the ingredients have been formed into a homogeneous mixture or solution, the mixture is poured into molds of desired size and shape and cooled, or permitted to cool, and become solid when it is ready for use as such, or packaged, as will appear hereinafter.

It will be appreciated that the stick is formed without the use of pressure or of binding agents, but rather by the heating of the ingredients together to form a homogeneous mixture or solution, with partial reaction of the ammonium chloride and zinc oxide, which occurs, it is believed, by the fact that the several ingredients are rendered mutually soluble.

In use of the stick in tinning, soldering, and the like operations, the temperature to which the stick is subjected is greatly higher, say of the order of 500° F., and the flux becomes operative through completion of the reaction between the ammonium chloride and zinc oxide, with the evolution of water vapor and ammonia in large quantity.

When it is desired to include solder in the stick, such will be accomplished, for example, by mixing granulated solder with the homogeneous mixture or solution before molding, by inserting a plurality of lengths, as wires, of solder into the flux in the mold, by inserting a core of solder into the flux in the mold, or by molding the flux as a core into a length of solder, or in any other desired manner, it being noted that in use the flux will melt at a lower temperature than the solder and will clean, deoxidize and prepare a surface so that when the solder melts and spreads over the surface, it will perfectly bond thereto.

As a specific example of a fluxing stick according to this invention and of the method according to this invention, 100 parts by weight of zinc ammonium chloride double salt and 33 parts by weight of zinc oxide are heated together at a temperature of about 250° F. until a completely homogeneous liquid mass or solution is formed with partial reaction between the zinc oxide and the ammonium chloride of the double salt, as indicated by the evolution of some water and a slight amount of ammonia. The homogenous mass or solution when formed is poured into molds of suitable size and shape and permitted to cool. If desired, though not necessarily, solder may be included as indicated above and the stick may be packaged, as will hereinafter appear.

The fluxing stick according to this invention, while it may be used as formed, with or without the inclusion of solder, as described above, will desirably, in accordance with more specific aspects of this invention, be packaged for its protection against absorption of moisture and for convenience in use.

In the accompanying drawing by which preferred embodiments of this invention are illustrated:

Referring more particularly to Figures 1-4, A indicates a fluxing stick of the composition and formed by the method described above. In the form illustrated the stick A is of cylindrical form, but it will be appreciated that it may have any other desired form and dimensions.

The stick A is enclosed in a metal casing B, which will protect the stick A from atmospheric moisture. The metal casing may be of any suitable metal, as tin, aluminum, zinc, lead, or the like, or, as will appear, may be formed of solder and will conform to the shape of the stick A. The metal casing may be open at both ends, but desirably will be of the order of a collapsible tube closed at one end $b$ and open at the other end to enable the composition forming the stick to be molded directly into the metal casing as a mold. The end, or ends, of the stick A at the open end, or ends, of the casing will be coated with wax, petrolatum, or other moisture-resistant material C, to close the open end, or ends, of the tube for protection of the stick against moisture.

The metal encased stick will in turn be encased in an outer container conforming to the shape of the stick and comprising a pair of separate members D, D' carrying, respectively, end caps $d$ and $d'$. The member D will be of substantially little extent with respect to the stick A, while the member D' will cover the balance of the stick from the closed end $b$ of the casing B, if it have a closed end, and will be removable and replaceable. The members D, D' and the end caps $d, d'$ may be made of any suitable material, preferably a material of low heat conductivity, as, for example, cardboard or fibre board.

The structure illustrated by Figures 1-4 may be stocked indefinitely without deterioration of the stick A, since the stick is protected from moisture or humidity by the metal casing B sealed by the wax or petrolatum C. When the stick is to be used in a tinning, soldering, or the like, operation, the member D' with its cap $d'$ is slid off the stick and the end of the stick applied to the suitably heated work by grasping the member D, which will protect the user's hand from heat conducted through the stick from the work. As will be appreciated, the metal casing B will melt off as the stick melts on application to the work. When the stick has performed its function with respect to a given piece of work, the member D' with its cap $d'$ is replaced on the stick and the structure may then be carried in the pocket, tool kit, or as may be desired until needed.

Referring now more particularly to Figures 5-8, these figures illustrate modified forms of the stick A shown in Figures 1-4.

Figure 1:
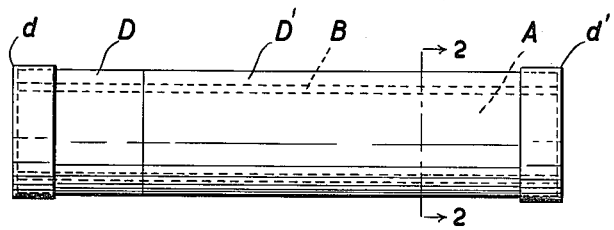
Figure 1 is a longitudinal view of a packaged fluxing stick according to this invention.
Figure 2:
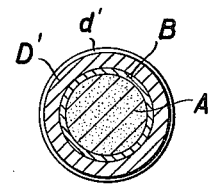
Figure 2 is a cross-sectional view on line 2—2, Figure 1.
Figure 3:
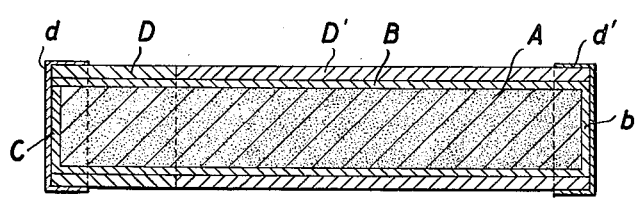
Figure 3 is a longitudinal sectional view of the subject of Figure 1.
Figure 4:
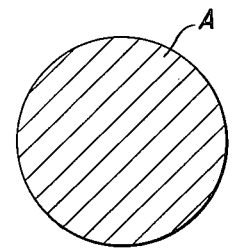
Figure 4 is a cross-sectional view, on an enlarged scale, of the fluxing stick contained in the package shown in Figure 1.
Figure 5:
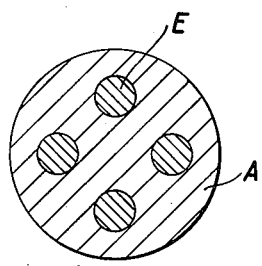
Figures 5-8 are cross-sectional views, on an enlarged scale, of modifications of the fluxing stick illustrated by Figure 4.

Figure 5 illustrates the inclusion in the stick A of lengths of solder E, which extend the length of the stick, as it were, as in a matrix of the flux composition, and may be cylindrical, in number and arranged as shown, or of any other desired shape, number and arrangement.

Figure 6:
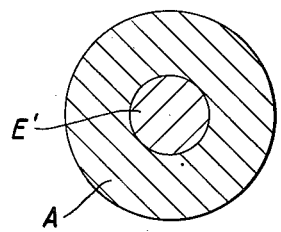
Figure 7:
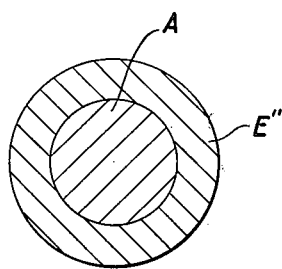

Figure 6 illustrates the provision of a core of solder E' in the stick A, while Figure 7 illustrates a stick of flux A encased as a core in a casing of solder E''. In this case the metal casing B is unnecessary.

Figure 8:
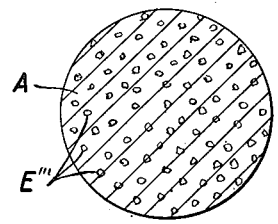

Figure 8 illustrates the stick as formed from a mixture of the flux ingredients with particles of solder E''', as, for example, granulated solder. In this case the flux serves as a matrix for the particles of solder.

The several forms of stick shown by Figures 5-8 will be encased in the capped members D, D' and will be used in the manner of use of the form shown in Figures 1-4, except that since the stick A contains solder, they may be used for tinning rather than for fluxing only.

It will be appreciated that the particular description and specific examples of fluxing sticks and method for their production given above is not intended to be in limitation of this invention since various modifications in the particular disclosure may be made without departing from the scope of the appended claims.

What I claim and desire to protect by Letters Patent is:

1. A fluxing stick comprising a solid, rigid, elongated stick of flux consisting essentially of zinc chloride, ammonium chloride and zinc oxide, a metal casing closed at one end and opened at the other end and surrounding said flux and a coating of fusible moisture resistant material on said flux adjacent the open end of said casing.

2. A fluxing stick according to claim 1 characterized by the fact that a second casing formed from material of low heat conductivity and having a removable end cap embraces said first mentioned casing.

FRANK D. McBRIDE.

REFERENCES CITED

The following references are of record in the file of this patent:

UNITED STATES PATENTS

| Number | Name | Date |
|---|---|---|
| 812,494 | Hussey | Feb. 13, 1906 |
| 923,934 | Benson | June 8, 1909 |
| 1,697,845 | Adams | Jan. 8, 1929 |
| 1,891,546 | Krembs | Dec. 20, 1932 |
| 1,843,303 | Ripley | Feb. 2, 1932 |
| 2,012,809 | Derich | Aug. 27, 1935 |
| 2,103,237 | Deckert | Dec. 28, 1937 |
| 2,327,958 | Carey | Aug. 24, 1943 |
| 2,363,306 | Fiske | Nov. 21, 1944 |
| 2,372,859 | Sparks | Apr. 3, 1945 |

FOREIGN PATENTS

| Number | Country | Date |
|---|---|---|
| 19,891 | Australia | Apr. 25, 1905 |